M. KIMBLE.
VEHICLE DRIVE.
APPLICATION FILED MAR. 8, 1920.

1,351,292. Patented Aug. 31, 1920.

M. Kimble
Inventor

Witness

UNITED STATES PATENT OFFICE.

MARTIN KIMBLE, OF HIGHLAND PARK, ILLINOIS.

VEHICLE-DRIVE.

1,351,292.  Specification of Letters Patent.  Patented Aug. 31, 1920.

Application filed March 8, 1920. Serial No. 364,165.

*To all whom it may concern:*

Be it known that I, MARTIN KIMBLE, a citizen of the United States, residing at Highland Park, in the county of Lake and State of Illinois, have invented a new and useful Vehicle-Drive, of which the following is a specification.

The device forming the subject matter of this application is a vehicle drive of that general type disclosed in my prior Patent No. 1,253,839, granted on the 15th day of January 1918, for sundry improvements in a front drive for motor driven vehicles.

It is the object of the present invention to provide novel means whereby certain parts may be kept in operative relation to each other, when the wheels of the vehicle are set for straight-ahead travel, a general statement which will be understood better after the following description has been perused and after the construction shown in the above mentioned patent has been discussed.

Figure 1:
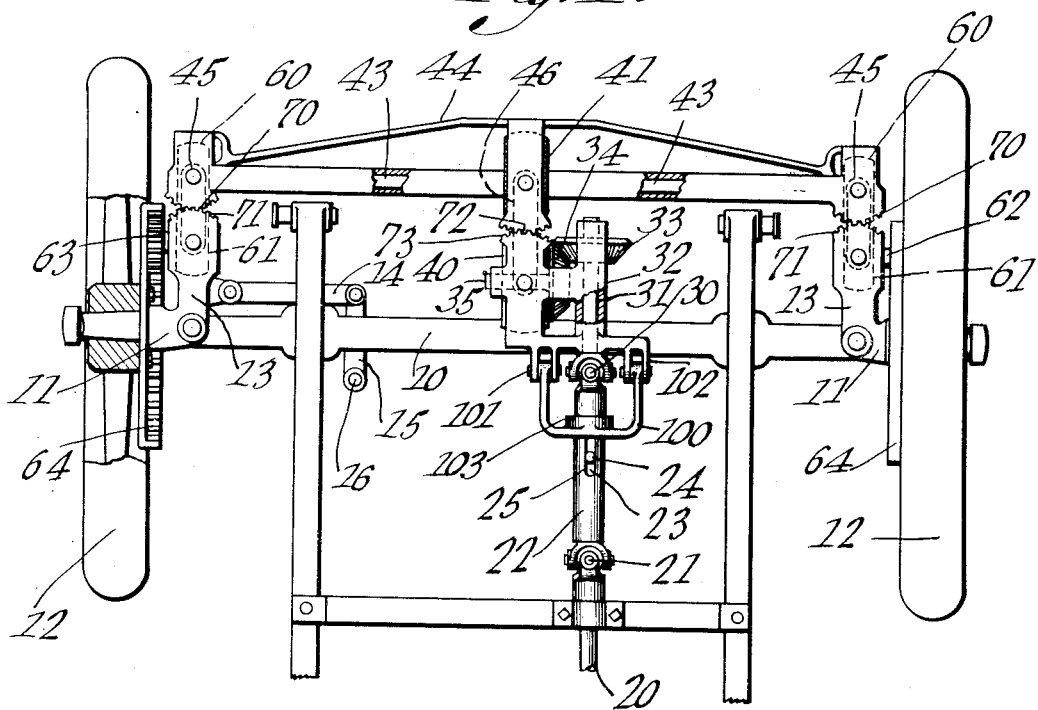
Figure 2:
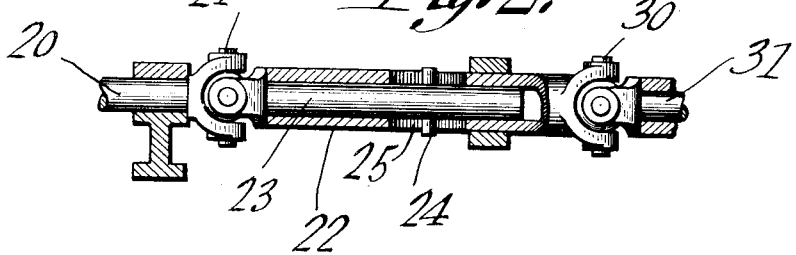
Figure 3:
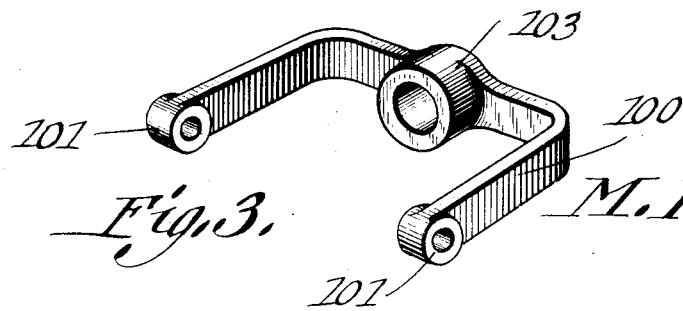

In the drawing:—Figure 1 shows, in top plan, a portion of a vehicle wherein the improvements contemplated by this application have been embodied, parts being broken away; Fig. 2 is a sectional detail disclosing the telescopic shaft and attendant parts; Fig. 3 is a perspective view showing the hanger which is one of the characteristic features of this application.

In order that the improvement embodied in this application may be understood and appreciated, it is necessary to describe in a general way, much of the structure shown in my Patent No. 1,253,839. The following description reads on the drawing of the aforesaid patent, for the most part, proper indications being made when that which is new is to be distinguished from that which is old.

The front axle 10 of a motor driven vehicle is provided at its ends with pivoted stub axles 11, on which are journaled the front or steering wheels 12. The stub axles 11 are provided with forwardly extending angular arms 13, of which one is connected by a link 14 with an arm 15 projecting forwardly from a steering shaft 16 under the control of the driver. The front or steering wheels 12 are driven from the shaft 20 of a motor (not shown) and the forward end of this shaft 20 is connected by a universal joint 21 with a shaft 23 mounted to slide in a sleeve 22, the shaft being provided with a pin 24 engaging a slot 25 formed in the sleeve 22, so that when the motor shaft 20 is rotated, and with it the shaft 23, then a rotary motion is given to the sleeve 22. The forward end of the sleeve 22 is pivotally connected by a universal joint 30 with a shaft 31 journaled in a bracket 32 and carrying a bevel gear wheel 33 in mesh with a bevel gear wheel 34 having its shaft 35 journaled in the bracket 32. With the bevel gear wheel 34 rotates a spherical gear wheel 40 attached to or formed on the back of the bevel gear wheel 34, and the spherical gear wheel 40 is in mesh with a spherical gear wheel 41 forming the master wheel of a compensating gearing as shown in my patent above alluded to, motion being transmitted to two transverse shafts 43 journaled in a yoke 44 supported at its ends by links 45 from the angular arms 13 of the stub axles 11.

The middle of the yoke 44 is connected by links 46 with the bracket 32 to support the latter from the yoke. On the outer ends of the yoke shafts 43 are secured spherical gear wheels 60 in mesh with similar gear wheels 61 having their shafts 62 journaled in suitable bearings arranged on the angular arms 13 of the stub axles 11. On the shafts 62 are secured pinions 63 in mesh with internal gear wheels 64 secured concentrically to the front or steering wheels 12.

The ends of the yoke 44 are provided with segmental gear wheels 70 in mesh with segmental gear wheels 71 formed on the ends of the angular arms 13 of the stub axles. The yoke 44 is provided at its middle with segmental gear wheels 72 in mesh with segmental gear wheels 73 formed on the bracket 32.

The device as thus far described duplicates the showing of my aforementioned patent, aside from the fact that the sleeve 22 and not the shaft 23 is connected, in this application, to the shaft 31. The structure operates as set forth in my prior patent, the driving train including the shaft 20, the shaft 23, the sleeve 22, the shaft 31, the gear wheel 33, the gear wheel 34, the gear 40, the gear 41, the shafts 43, the gears 60, the gears 61, the shafts 62, the pinions 63, the internal gears 64 and the wheels 12. The parts 70—71 constitute interengaging elements for imparting movement from one stub axle 11 to the other, by way of the yoke 44, and the parts 72—73 constitute interengaging elements for imparting swinging movement from the yoke to the bracket 32.

In Fig. 2 of my prior patent, the wheels 12 are shown as laterally inclined, the shaft 31 being disposed at an acute angle to the axle 10. In Fig. 1 of my prior patent, the wheels 12 are shown as set for a straight course, the shaft 31 being disposed at right angles to the axle 10. As a matter of fact, the shaft 31 does not always stand as shown in Fig. 1 of my prior patent when the wheels 12 are disposed as shown in that figure, the shaft and attendant parts often remaining as depicted in Fig. 2 of my prior patent. This circumstance does not render the device inoperative, but it produces unequal wear on certain gears—a condition to be gotten rid of, if possible.

Various operations may take place to prevent the restoration of the parts to the positions of Fig. 1 of my prior patent when the wheels are turned from the position of Fig. 2 of that patent to the position of Fig. 1 thereof, and the discussion of a single case will serve as an illustration. For instance, when the yoke 44 moves to the right from the position of Fig. 2 of my prior patent to the position of Fig. 1 thereof, the shaft 31 may remain at an acute angle to the axle 10, there occurring a lateral knuckling at the universal joint 30. A universal joint at the point 30 is necessary due to the vertical movement of the vehicle frame and in order to maintain a driving connection between the parts which the joint 30 unites, but it is clear that if the lateral component can be taken out of the motion resulting at the joint 30, the pivot point so far as lateral movement is concerned, will be at the joint 21.

The foregoing being understood, it may be stated that this present application aims to provide means whereby the lateral movement at the joint 30 may be obviated. With this end in view, a hanger 100 is hinged at 101 to ears 102 on the bracket 32 for vertical swinging movement only, the hanger having a boss 103 wherein the sleeve 22 rotates. The hanger 100, clearly, prevents relative lateral movement between the sleeve 22 and the shaft 31, and, as a consequence, when the wheels 12 are set for a straight-ahead drive, as shown in Fig. 1 of this application, the shaft 31 and attendant parts will be disposed as there delineated. Since the sleeve 22 and not the shaft 23 is connected by the joint 30 to the shaft 31, the sleeve will have no longitudinal movement and there is, therefore, a very good reason for reversing the parts 22 and 23 from the position shown in my Patent No. 1,253,839.

I claim:

1. In a vehicle of the class described, a front axle; stub axles pivoted thereto; ground wheels journaled on the stub axles; a yoke; a bracket; links connecting the yoke with the stub axles and with the bracket; means for moving one stub axle to effect a steering of the vehicle; interengaging elements on the yoke and on the stub axles for imparting swinging movement from said stub axle to the other stub axle; interengaging elements on the yoke and on the bracket for imparting swinging movement to the bracket; a drive shaft; a second shaft journaled in the bracket; an operative connection between the second shaft and the ground wheels; a telescopic shaft; a first universal joint connecting the telescopic shaft with the drive shaft; a second universal joint connecting the telescopic shaft with the second shaft; and means coöperating with the telescopic shaft and with the bracket for preventing lateral movement at the second universal joint.

2. A device of the class described, constructed as set forth in claim 1, and further characterized by the fact that the last specified means is in the form of a hanger hinged to the bracket for swinging movement in a single plane and receiving the telescopic shaft for rotation.

3. A device of the class described, constructed as set forth in claim 1 and further characterized by the fact that the telescopic shaft comprises a sleeve connected by the second universal joint to the second shaft and a third shaft slidably received in the sleeve and connected by the first universal joint to the drive shaft, the last specified means of claim 1 comprising a hanger hinged to the bracket for swinging movement in a single plane and receiving the sleeve for rotation.

In testimony that I claim the foregoing as my own, I have hereto affixed my signature in the presence of two witnesses.

MARTIN KIMBLE.

Witnesses:
 MASON B. LAWTON,
 IVY E. SIMPSON.